United States Patent [19]

Shimomura et al.

[11] Patent Number: 4,699,549
[45] Date of Patent: Oct. 13, 1987

[54] INSERT ROTARY CUTTER

[75] Inventors: Hiroshi Shimomura, Nakano; Sueji Takaya, Abiko; Kazuo Iizuka, Warabi, all of Japan

[73] Assignee: Mitsubishi Kinzoku Kabushiki Kaisha, Tokyo, Japan

[21] Appl. No.: 871,117

[22] Filed: Jun. 5, 1986

[30] Foreign Application Priority Data

Jun. 6, 1985 [JP] Japan ............................. 60-85577[U]
Aug. 14, 1985 [JP] Japan ........................... 60-124807[U]
Aug. 14, 1985 [JP] Japan ........................... 60-124808[U]
Aug. 14, 1985 [JP] Japan ........................... 60-124809[U]

[51] Int. Cl.4 ............................................. B23C 5/20
[52] U.S. Cl. ...................................... 407/42; 407/62; 407/113; 408/224; 408/713
[58] Field of Search ....................... 407/36, 42, 53, 54, 407/62, 113, 114; 408/223, 224, 186, 199, 713

[56] References Cited

U.S. PATENT DOCUMENTS 3,279,034 10/1966 Kaiser ................................. 407/113
3,279,035 10/1966 Johnson .............................. 407/113
3,486,211 12/1969 Greenleaf ............................ 407/113
3,551,978 1/1971 Berry .................................. 407/113
3,792,515 2/1974 Lundgren ............................ 407/113
3,800,379 4/1974 Hopkins .............................. 407/113
4,529,339 7/1985 Shimomura et al. ................. 407/36
4,588,331 5/1986 Yoshinori ............................ 407/113
4,618,296 10/1986 Allaire et al. ....................... 407/113

FOREIGN PATENT DOCUMENTS 649508 2/1979 U.S.S.R. .............................. 407/114

Primary Examiner—Nicholas P. Godici
Assistant Examiner—Jerry Kearns
Attorney, Agent, or Firm—Cushman, Darby & Cushman

[57] ABSTRACT

An insert rotary cutter for processing a metal workpiece includes a cutter body having an axis of rotation therethrough. The cutter includes at least one cutter insert releasably mounted on an outer periphery of the body. The insert is of a generally polygonal shape having a curved front face. The front face has a pair of opposed marginal ridges serving as respective main cutting edges. The front face has marginal portions disposed adjacent and extending along the main cutting edges, and the marginal portions serve as respective rake surfaces for the main cutting edges. Each of the rake surfaces is convexly curved as viewed from a respective one of the main cutting edges and is concavely curved as viewed along a respective one of the main cutting edges.

20 Claims, 61 Drawing Figures

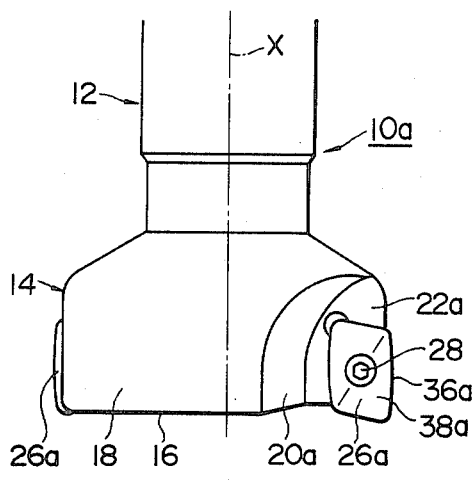
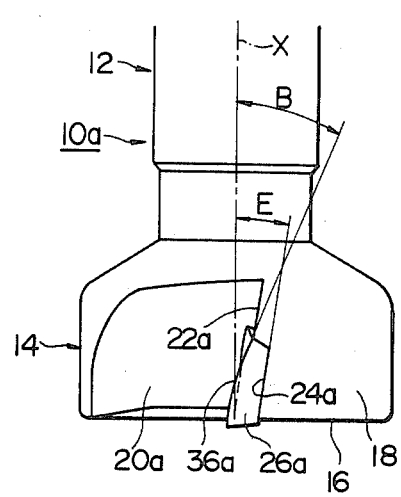
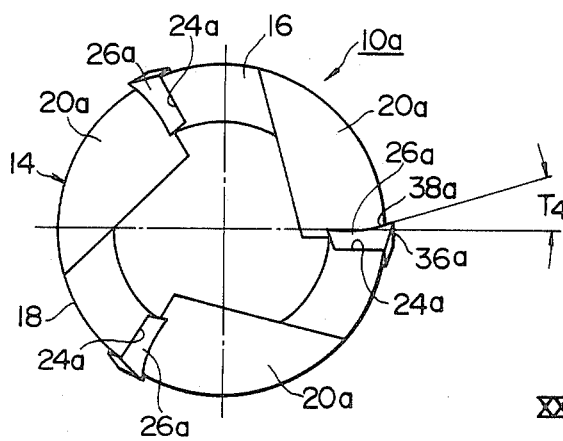
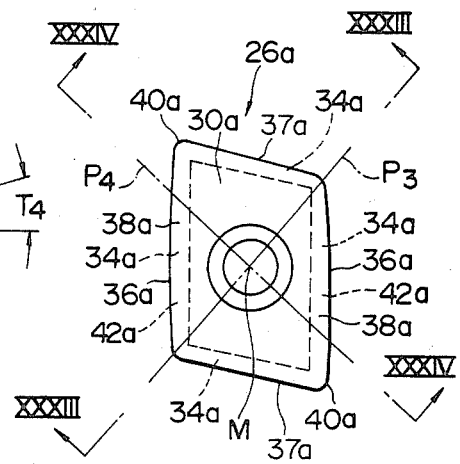
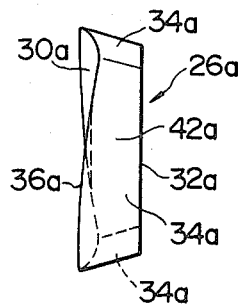
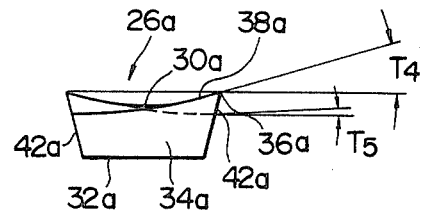

INSERT ROTARY CUTTER

BACKGROUND OF THE INVENTION

1. Field of the Invention

The present invention relates to an insert rotary cutter having at least one indexable cutter insert attached to a forward end of a cutter body thereof.

2. Prior Art

Recently, insert rotary cutters of various types have been employed in milling machines, and cutter inserts having convex rake surfaces for their cutting edges have been developed for use in such rotary cutters. Several such related rotary cutters are shown in FIGS. 1 to 19 of the accompanying drawings in which the same or similar members are designated by the same characters. One such cutter 100 shown in FIGS. 1 to 8 comprises a generally cylindrical cutter body 102 including a forward end 104 and a rearward end, the rearward end being adapted to be fixedly secured to a machine spindle so that the body 102 can be rotated in the direction of the arrow R about an axis X therethrough. The forward end 104, which has a forward end face 106 and a circumferential surface 108, includes a pocket 110 formed therein and opening to the circumferential surface 108 and the forward end face 106. The pocket 110 has a circumferentially facing surface 112 sloping in the circumferential direction opposite to that of rotation of the body 102 away from the forward end face 106. The surface 112 has an insert receiving recess 114 formed therein and opening to both the forward end face 106 and the circumferential surface 108, the bottom face of the recess 114 being disposed parallel to the surface 112. Releasably mounted in the recess 114 is an indexable cutter insert 116 of hard wear resistant material fixed in place by a clamp screw 118.

The insert 116, as best shown in FIGS. 5 to 8, comprises a generally rhombic plate defined by a curved front face 120, a flat rear face 122 disposed generally parallel to the front face 120, and four side faces 124. The front face 120 has a pair of parallel opposed marginal ridges serving as respective main cutting edges 126. Those marginal portions of the front face 120 disposed adjacent and extending along the main cutting edges 126 serve as respective rake surfaces 128 for the main cutting edges 126. Each rake surface 128 is convexly arcuate so that each main cutting edge 126 is convexly arcuate and the thickness of the insert 116 along a respective one of the main cutting edges 126 is the largest at the central portion thereof. Each of the side faces 124 is sloping inwardly in a direction away from the front face 120. Corner marginal ridges of the front face 120 serve as respective corner cutting edges 130. The pair of side faces 124 extending from the main cutting edges 126 toward the rear face 122 serve as flanks 132 for the main cutting edges 126, respectively. The insert 116 is disposed in the recess 114 with the rear face 122 being held in contact with the bottom face thereof in such a manner that one of the main cutting edges 126 is indexed in its working position so as to slightly protrude radially outwardly from the circumferential surface 108, and that a mounting inclination angle E of the insert 116 with respect to the axis X of the body 102 is selected to be positive, each main cutting edge 126 extending along the surface 112.

Another related rotary cutter 100a shown in FIGS. 9 to 13 differs from the aforementioned cutter 100 in that a cutter body 102a has a plurality of, say four, generally radially outwardly-opening pockets 110a formed in a circumferential surface 108 of its forward end 104 and disposed adjacent a forward end face 106 in circumferentially and axially equally spaced relation to one another. Each pocket 110a has a circumferentially facing surface 112a including a recess 114a formed therein and opening to the circumferential surface 108, the surface 112a sloping in the circumferential direction opposite to that of rotation of the body 102a away from the forward end face 106, the bottom face of the recess 114a being disposed parallel to the surface 112a. Releasably mounted in each recess 114a is the same cutter insert 116 as that employed in the aforementioned cutter 100. Each insert 116 is disposed in such a manner that one of the main cutting edges 126 is indexed in its working position so as to slightly protrude radially outwardly from the circumferential surface 108, and that a mounting inclination angle E of each insert 116 with respect to the axis X of the body 102a is selected to be positive, each main cutting edge 126 extending along the surface 112a. The indexed main cutting edges 126 of the four inserts 116 are disposed, as shown in FIGS. 12 and 13, in series axially of the body 102a as viewed in the circumferential direction, so as to be brought into alignment with and pass through a common line L parallel to the axis X of the body 102a when the body 102a is rotated.

Still another related rotary cutter 100b shown in FIGS. 14 to 19 comprises a cutter body 102b having a disk-shaped base portion 140 of a circular cross-section integrally formed therewith at a forward end thereof in coaxial relation thereto. The base portion 140 has a forward axial face 142, a rearward axial face 144 and a circumferential surface 146 lying between the forward and rearward axial faces 142 and 144. The base portion 140 also includes a pair of pockets 110b formed therein in diametrically opposite relation. Each of the pair of pockets 110b has a circumferentially facing surface 112b, one of the surfaces 112b sloping in the circumferential direction opposite to that of rotation of the body 102b away from the forward axial face 142, as shown in FIG. 15, while the other surface ( not shown ) is sloping in the same circumferential direction away from the rearward axial face 144. Formed in each surface 112b is a recess 114b having a bottom face disposed parallel to each surface 112b and opening to the circumferential surface 146, one of the recesses 114b also opening to the forward axial face 142 of the base portion 140 while the other recess ( not shown ) is also opening to the rearward axial face 144 thereof. Releasably mounted in each recess 114b is the same cutter insert 116 as those employed in the aforementioned cutters 100 and 100a. Each insert 116 is disposed in such a manner that one of the main cutting edges 126 is indexed in its working position so as to slightly protrude radially outwardly from the circumferential surface 146 of the base portion 140, one of the corner cutting edges 130 of the insert 116 in the one recess 114b being disposed adjacent the corner defined by the forward axial face 142 and the circumferential surface 146 while one of the corner cutting edges 130 of the other insert 116 in the other recess is disposed adjacent the corner defined by the rearward axial face 144 and the circumferential surface 146, and that mounting inclination angles E of the inserts 116 with respect to the axis X are selected to be positive, respectively, as shown in FIGS. 15 and 19. When the base portion 140 is viewed in the circumferential direction, the two inserts 116 are, as shown in FIG. 18, in series axially of the body 102b so as to cooperate to cut T-shaped grooves or the like in a workpiece W.

In the related art cutters 100, 100a and 100b described above, since the rake surface 128 for the indexed main cutting edge 126 of each insert 116 is convexly arcuate, an included angle of a foremost end of each insert 116 is larger than that of an insert having a flat rake surface, thereby the former insert 116 being superior to the latter in the strength of its foremost end. In addition, it is known that, by virtue of unique cutting behavior due to the convexly arcuate shape of the indexed main cutting edge 126, the former insert 116 has advantageous features that its cutting resistance and cutting heat generated during cutting operation are reduced. Moreover, at the rearward portion of the insert 116 extending rearwardly of the body 102, 102a, 102b from the center of the indexed main cutting edge 126, a tangent angle B, which corresponds to an inclination angle of the indexed main cutting edge of the insert or an axial rake angle, is positive and larger than the mounting inclination angle E, as shown in FIGS. 2, 9 and 15, so that chips are smoothly removed along the rake surface 128.

However, in the related art cutters 100, 100a and 100b described above, since the rake surface 128 along the indexed main cutting edge 126 of each insert 116 is convexly arcuate so as to provide the convexly arcuate main cutting edge 126, a tangent angle $T_1$ of the rake surface 128 in a plane disposed perpendicular to the indexed main cutting edge 126 and passing through the central portion thereof is positive, as shown in FIG. 7, whilst the tangent angle $T_2$ of the rake surface 128 in a plane disposed perpendicular to the indexed main cutting edge 126 and passing through the rearward portion thereof is, as shown in FIG. 8, negative. The tangent angles $T_1$ and $T_2$ correspond to true rake angles or radial rake angles, as shown in FIGS. 3 and 4, FIGS. 10 and 11, and FIGS. 16 and 17. As a result, the true rake angle at the forward portion of the indexed main cutting edge 126 is positive while the true rake angle at the rearward portion thereof is negative. Therefore, particularly in deep cutting operation, in which the rearward portion of the main cutting edge 126 is used, the related art cutters have the drawback that the cutting resistance is extremely increased.

SUMMARY OF THE INVENTION

It is therefore an object of the present invention to provide an insert rotary cutter in which the cutting resistance during cutting operation is substantially reduced, thereby achieving excellent machinability.

Another object of the present invention is to provide a cutter insert for releasably mounting in the rotary cutter and especially adapted for use therewith.

According to a first aspect of the present invention, there is provided an insert rotary cutter for processing a metal workpiece comprising a cutter body having an axis of rotation therethrough, and at least one cutter insert releasably mounted on an outer periphery of the body, the insert being of a generally polygonal shape having a curved front face, the front face having a pair of opposed marginal ridges serving as respective main cutting edges, the front face having marginal portions disposed adjacent and extending along the main cutting edges, the marginal portions serving as respective rake surfaces for the main cutting edges, each of the rake surfaces being convexly curved as viewed from a respective one of the main cutting edges and being concavely curved as viewed along a respective one of the main cutting edges.

According to a second aspect of the present invention, there is provided a cutter insert being of a generally polygonal shape having a curved front face, the front face having a pair of opposed marginal ridges serving as respective main cutting edges, the front face having marginal portions disposed adjacent and extending along the main cutting edges, the marginal portions serving as respective rake surfaces for the main cutting edges, each of the rake surfaces being convexly curved as viewed from a respective one of the main cutting edges and being concavely curved as viewed along a respective one of the main cutting edges.

BRIEF DESCRIPTION OF THE DRAWINGS

FIG. 27 is a front-elevational view of an insert rotary cutter in accordance with a second embodiment of the present invention;

FIG. 28 is a side-elevational view of the cutter of FIG. 27;

FIG. 29 is an end view of the cutter of FIG. 27;

FIG. 30 is a front-elevational view of a cutter insert employed in the cutter of FIG. 27;

FIG. 31 is a side-elevational view of the insert of FIG. 30;

FIG. 32 is an end view of the insert of FIG. 30;

DESCRIPTION OF PREFERRED EMBODIMENT OF THE INVENTION

Figure 1:
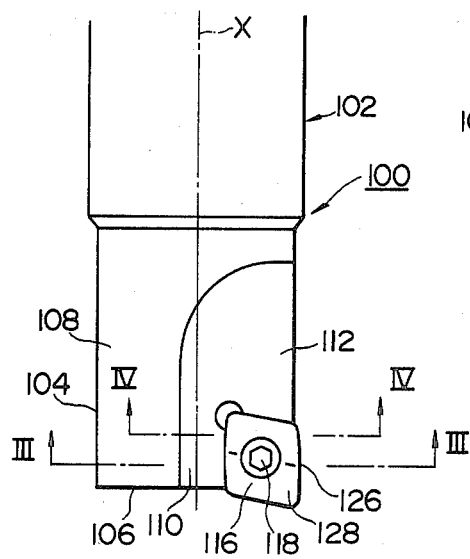
FIG. 1 is a front-elevational view of a related insert rotary cutter.
Figure 2:
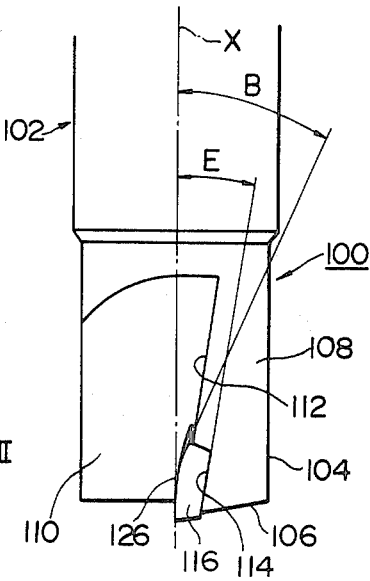
FIG. 2 is a side-elevational view of the cutter of FIG. 1.
Figure 3:
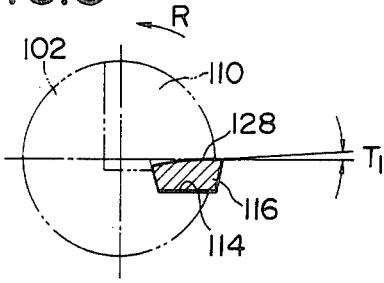
FIG. 3 is a cross-sectional view taken along the line III—III of FIG. 1.
Figure 4:
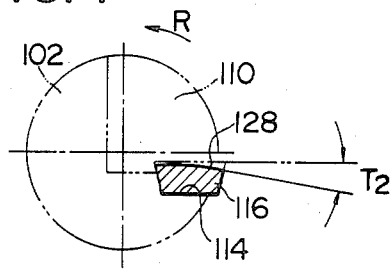
FIG. 4 is a cross-sectional view taken along the line IV—IV of FIG. 1.
Figure 5:
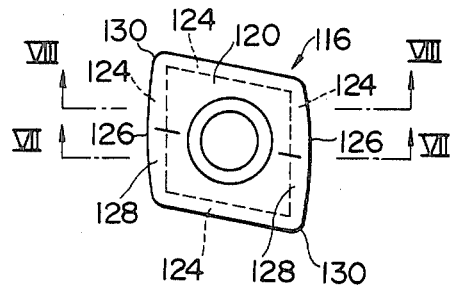
FIG. 5 is a front-elevational view of a cutter insert employed in the cutter of FIG. 1.
Figure 6:
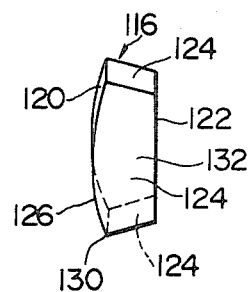
FIG. 6 is a side-elevational view of the insert of FIG. 5.
Figure 7:
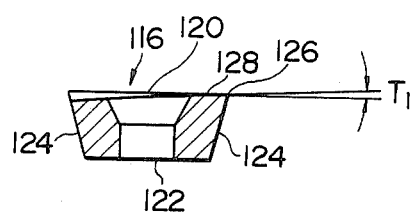
FIG. 7 is a cross-sectional view taken along the line VII—VII of FIG. 5.
Figure 8:
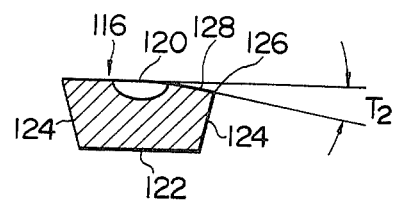
FIG. 8 is a cross-sectional view taken along the line VIII—VIII of FIG. 5.
Figure 9:
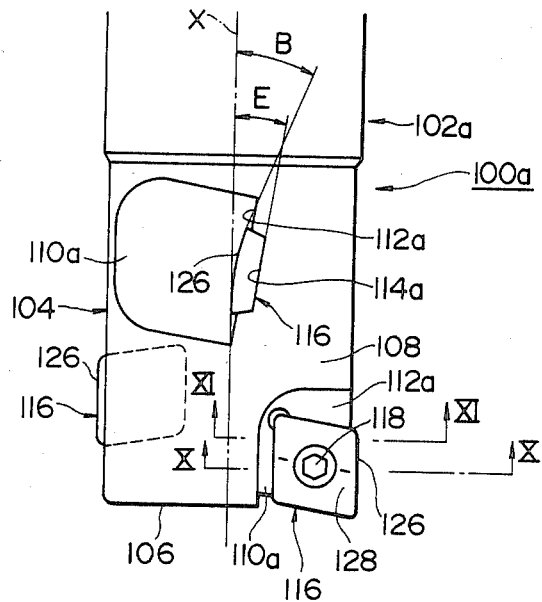
FIG. 9 is a front-elevational view of another conventional insert rotary cutter.
Figure 10:
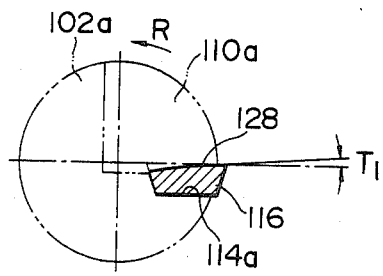
FIG. 10 is a cross-sectional view taken along the line X—X of FIG. 9.
Figure 11:
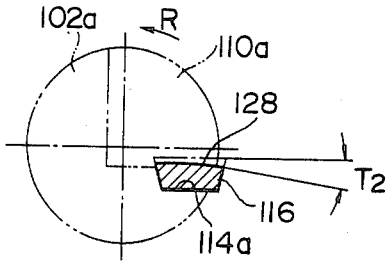
FIG. 11 is a cross-sectional view taken along the line XI—XI of FIG. 9.
Figure 12:
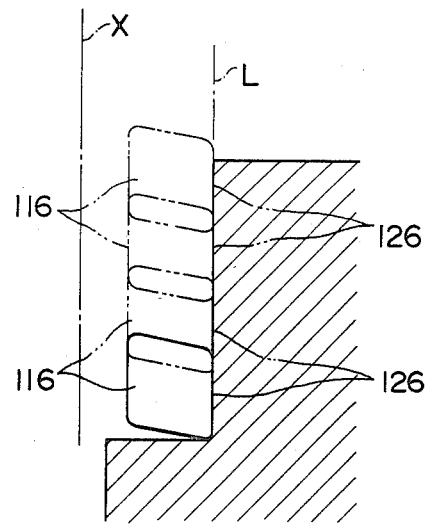
FIG. 12 is a schematic front-elevational view of cutter inserts employed in the cutter of FIG. 9, showing their disposition.
Figure 13:
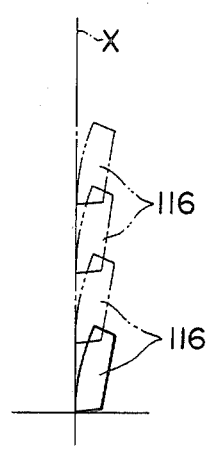
FIG. 13 is a schematic side-elevational view of the inserts of FIG. 12.
Figure 14:
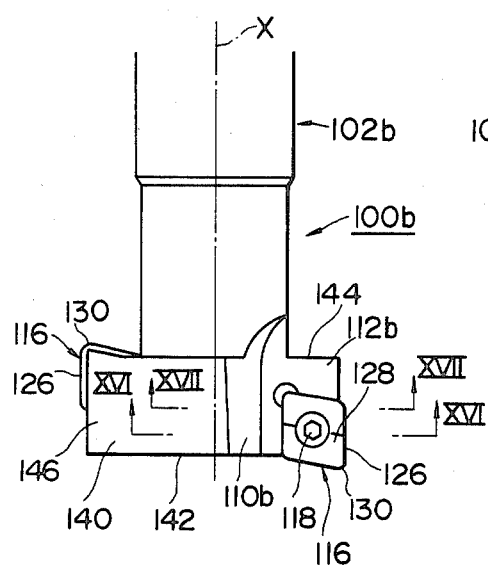
FIG. 14 is a front-elevational view of still another conventional insert rotary cutter.
Figure 15:
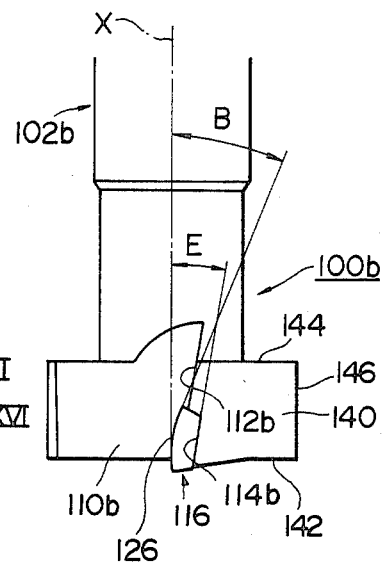
FIG. 15 is a side-elevational view of the cutter of FIG. 14.
Figure 16:
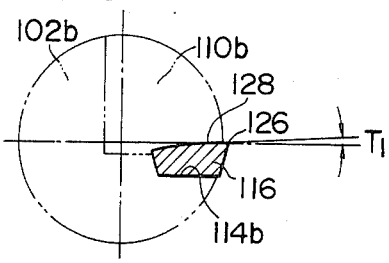
FIG. 16 is a cross-sectional view taken along the line XVI—XVI of FIG. 14.
Figure 17:
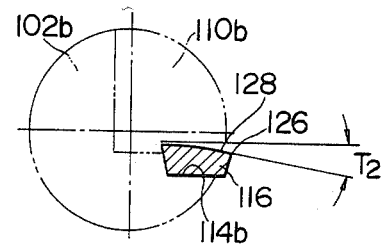
FIG. 17 is a cross-sectional view taken along the line XVII—XVII of FIG. 14.
Figure 18:
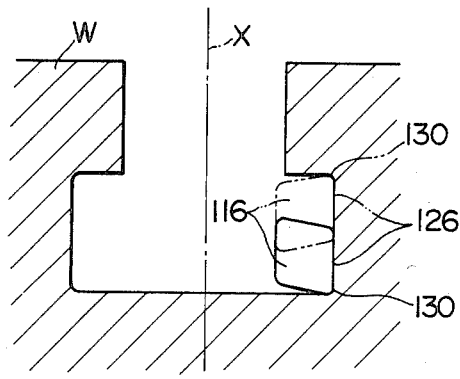
FIG. 18 is a schematic front-elevational view of cutter inserts employed in the cutter of FIG. 14, showing their disposition.
Figure 19:
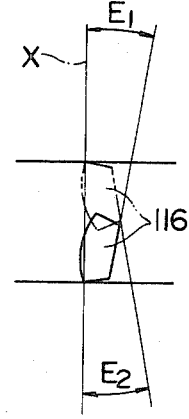
FIG. 19 is a schematic side-elevational view of the inserts of FIG. 18.
Figure 20:
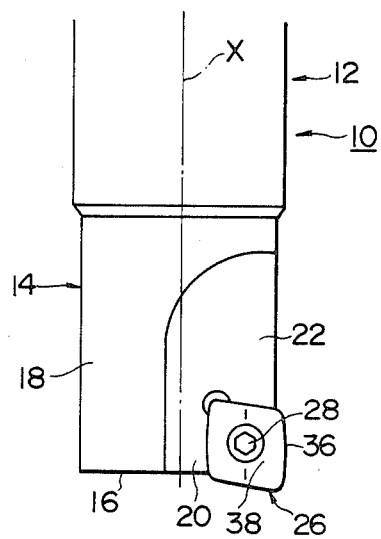
FIG. 20 is a front-elevational view of an insert rotary cutter in accordance with a first embodiment of the present invention.
Figure 21:
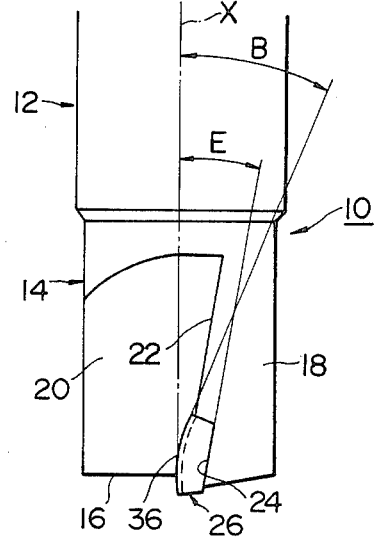
FIG. 21 is a side-elevational view of the cutter of FIG. 20.

Various embodiments of the present invention will now be described with reference to FIGS. 20 to 61 of the accompanying drawings in which the same reference characters are used to designate like parts or elements.

Referring to FIGS. 20 to 26, an insert rotary cutter, generally designated by the reference numeral 10, in accordance with a first embodiment of the present invention comprises a generally cylindrical cutter body 12 including a forward end 14 and a rearward end, the rearward end being adapted to be fixedly secured to a machine spindle so that the body 12 can be rotated in the direction of the arrow R about an axis X therethrough. The forward end 14, which has a forward end face 16 and a circumferential surface 18, includes a pocket 20 formed therein and opening to the forward end face 16 and the circumferential surface 18. The pocket 20 has a circumferentially facing surface 22 sloping in the circumferential direction opposite to that of rotation of the body 12 away from the forward end face 16. The surface 22 has a recess 24 formed therein and opening to both the forward end face 16 and the circumferential surface 18 of the body 12, the bottom face of the recess 24 being disposed parallel to the surface 22. Releasably mounted in the recess 24 is an indexable cutter insert 26 of hard wear resistant material fixed in place by suitable clamp means such as a clamp screw 28.

Figure 25:
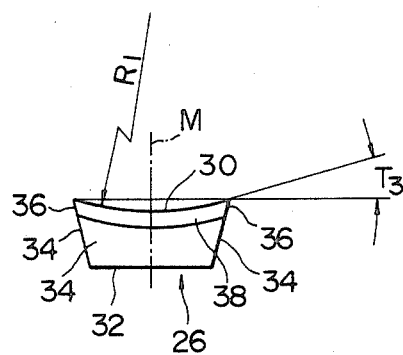
FIG. 25 is an end view of the insert of FIG. 23.
Figure 26:
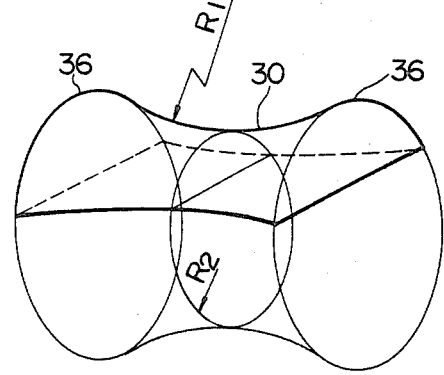
FIG. 26 is a schematic perspective view of a front face of the insert of FIG. 23.
Figure 33:
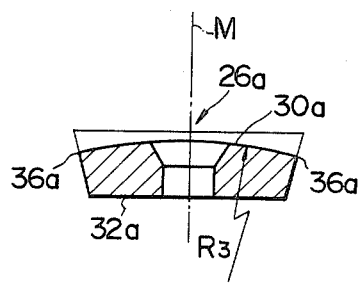
FIG. 33 is a cross-sectional view taken along the line XXXIII—XXXIII of FIG. 30.
Figure 34:
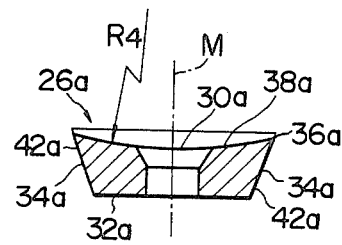
FIG. 34 is a cross-sectional view taken along the line XXXIV—XXXIV of FIG. 30.

The insert 26, as best shown in FIGS. 23 to 26, comprises a generally rhombic plate defined by a curved front face 30, a flat rear face 32 disposed generally parallel to the front face 30, and four side faces 34. The front face 30 has a pair of generally parallel opposed marginal ridges 36 serving as respective main cutting edges. Those portions of the front face 30 disposed adjacent and extending along the main cutting edges 36 serve as respective rake surfaces 38 for the main cutting edges 36. Each of the side faces 34 is sloping inwardly in a direction away from the front face 30. Corner marginal ridges 40 of the front face 30 serve as corner cutting edges, respectively. The pair of side faces 34 extending from the main cutting edges 36 toward the rear face 32 serve as flanks 42 for the main cutting edges 36, respectively. The front face 30 is concavely arcuate as viewed along each of the main cutting edges 36 in such a manner that, in a first plane P₁ perpendicular to the main cutting edges 36 and including an axis M of the plate or insert which extends in the direction of the thickness of the plate and passes through the center of the front face 30, it is of a concave arcuate shape having a radius $R_1$ and symmetrical with respect to the axis M. In addition, the front face 30 is convexly arcuate as viewed from each of the main cutting edges 36 in such a manner that, in a second plane $P_2$ perpendicular to the first plane $P_1$ and including the axis M of the plate, it is of a convex arcuate shape having a radius $R_2$ and symmetrical with respect to the axis M of the plate. Namely, the front face 30 is defined by a specific curved surface, that is, a part of a hyperboloid of one sheet having radii of curvature $R_1$ and $R_2$, as shown in FIG. 26. Thus, each of the main cutting edges 36 is convexly arcuate in such a manner that the distance between the main cutting edge 36 and a plane on which the rear face 32 lies is the largest at the central portion of the main cutting edge 36. The insert 26 is disposed in the recess 24 with the rear face 32 being held in contact with the bottom face thereof in such a manner that the pair of main cutting edges 36 are disposed in radially spaced relation to each other with respect to the body 12. The radially outer one of the pair of main cutting edges 36 is indexed in its working position so as to slightly protrude radially outwardly from the circumferential surface 18 and to extend generally along the bottom face of the recess 24, and a mounting inclination angle E of the insert 26 with respect to the axis X of the body 12 is selected to be positive.

Figure 22:
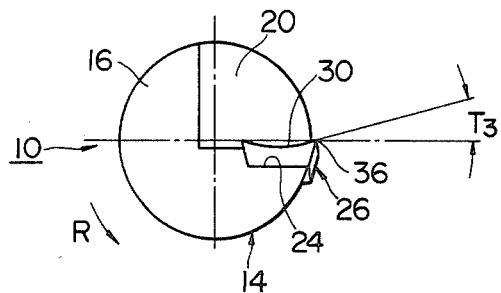
FIG. 22 is an end view of the cutter of FIG. 20.
Figure 23:
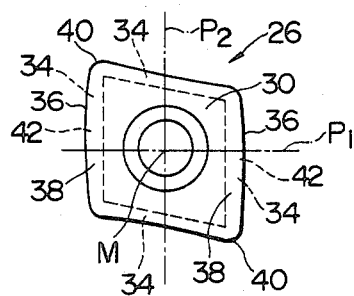
FIG. 23 is a front-elevational view of a cutter insert employed in the cutter of FIG. 20.
Figure 24:
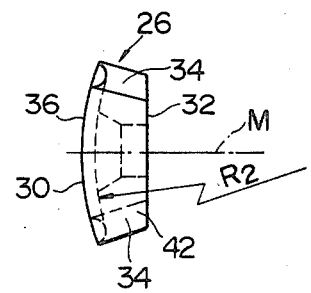
FIG. 24 is a side-elevational view of the insert of FIG. 23.

In the insert 26 described above, since the front face 30 is defined by the part of the hyperboloid of one sheet shown in FIG. 26, a tangent angle $T_3$ of the rake surface 38 along the indexed outer main cutting edge 36 is constant and positive, as shown in FIG. 25. Thus, in the cutter 10 employing the insert 26, a true rake angle corresponding to the tangent angle $T_3$ becomes positive along the total length of the indexed outer main cutting edge 36, as shown in FIG. 22. Accordingly, even in deep cutting operation, the cutter 10 is subjected to less cutting resistance, thereby achieving excellent machinability. In addition, as is the case with the related cutters 100, 100a, 100b employing the inserts 116 each having convex front face 120, at the rearward portion of the indexed outer main cutting edge 36 extending rearwardly of the body 12 from the central point thereof, the tangent angle B is positive and larger than the mounting inclination angle E of the insert 26, so that the cutter 10 has the same advantageous features as the related cutters have.

FIGS. 27 to 34 show a rotary cutter 10a in accordance with a second embodiment of the present invention. The cutter 10a differs from the aforementioned cutter 10 in that a forward end 14 of a cutter body 12 thereof includes a plurality of, say three, pockets 20a formed in a circumferential surface 18 and opening to the circumferential surface 18 and a forward end face 16. Each pocket 20a has a circumferentially facing surface 22a having a recess 24a opening to both the circumferential surface 18 and the forward end face 16. Each surface 22a is sloping in the circumferential direction opposite to that of rotation of the body 12 away from the forward end face 16, and the bottom face of each recess 24a is disposed parallel to a respective one of the surfaces 22a. Releasably mounted in each recess 24a is an indexable cutter insert 26a fixed in place by a clamp screw 28.

The insert 26a, as best shown in FIGS. 30 to 34, comprises a generally parallelogrammic plate defined by a curved front face 30a, a flat rear face 32a disposed generally parallel to the front face 30a, and four side faces 34a. The front face 30a has first and second pairs of generally parallel opposed marginal ridges 36a and 37a, the first pair of marginal ridges 36a serving as respective main cutting edges. Those portions of the front face 30a disposed adjacent and extending along the main cutting edges 36a serve as respective rake surfaces 38a for the main cutting edges 36a. Each of the side faces 34a is sloping inwardly in a direction away from the front face 30a. Corner marginal ridges 40a of the front face 30a serve as corner cutting edges, respectively. The pair of side faces 34a extending from the main cutting edges 36a toward the rear face 32a serve as flanks 42a for the main cutting edges 36a, respectively. Each insert 26a is disposed in a respective one of the recesses 24a with the rear face 32a being held in contact with the bottom face of the recess 24a in such a manner that the pair of main cutting edges 36a are disposed in radially spaced relation to each other with respect to the body 12. The front face 30a is convexly arcuate as viewed from each of the main cutting edges 36a in such a manner that, in a third plane $P_3$ including a rearmost end of the radially outer main cutting edge $36_a$, a foremost end of the radially inner main cutting edge 36a and an axis M of the plate, it is of a convex arcuate shape having a radius $R_3$ and symmetrical with respect to the axis M. In addition, the front face 30a is concavely arcuate as viewed along each of the main cutting edges 36a in such a manner that, in a fourth plane $P_4$ perpendicular to the third plane $P_3$ and including the axis M, it is of a concave arcuate shape having a radius $R_4$ and symmetrical with respect to the axis M. Thus, the outer main cutting edge 36a is convexly arcuate in such a manner that the distance between the outer main cutting edge 36a and a plane on which the rear face 32a lies is the largest at the foremost end of the outer main cutting edge 36a, and the inner main cutting edge 36a is also convexly arcuate in such a manner that the distance between the inner main cutting edge 36a and the plane on which the rear face 32a lies is the largest at the rearmost end of the inner main cutting edge 36a. The outer main cutting edge 36a of each insert 26a is indexed in its working position so as to slightly protrude radially outwardly from the circumferential surface 18 and to extend generally along the bottom face of each recess 24a. In the insert 26a, by virtue of the curved front face 30a, the tangent angle of the rake surface 38a along the indexed outer main cutting edge 36a is positive and gradually decreasing from $T_4$ to $T_5$ as it approaches the rearmost end of the outer main cutting edge 36a, as shown in FIG. 32.

The cutter 10a described above not only has the same advantageous features as the cutter 10 of the first embodiment, but also can obtain, as shown in FIG. 28, a larger tangent angle B for the rearward portion of the indexed main cutting edge 36a than the cutter 10. Therefore, chips produced during cutting operation are removed more easily than in the cutter 10.

Figure 35:
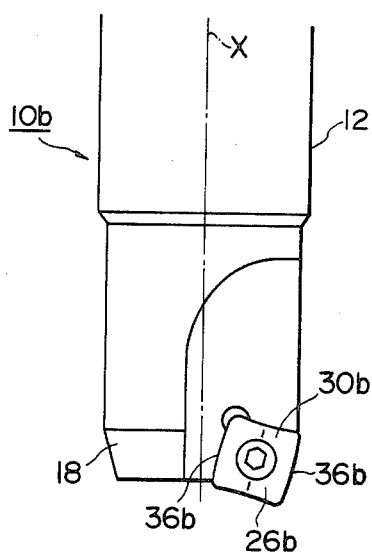
FIG. 35 is a front-elevational view of an insert rotary cutter in accordance with a third embodiment of the present invention.
Figure 36:
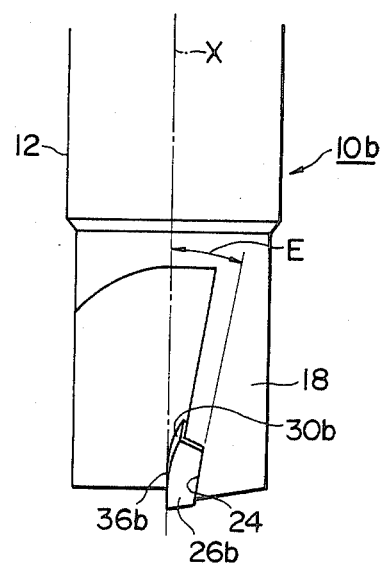
FIG. 36 is a side-elevational view of the cutter of FIG. 35.
Figure 37:
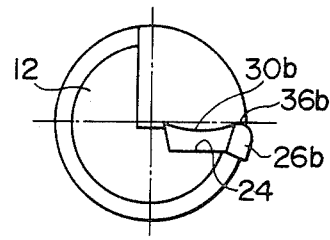
FIG. 37 is an end view of the cutter of FIG. 35.
Figure 38:
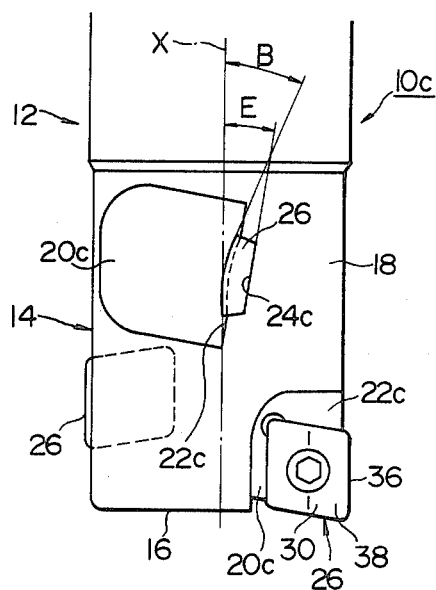
FIG. 38 is a front-elevational view of an insert rotary cutter in accordance with a fourth embodiment of the present invention.
Figure 39:
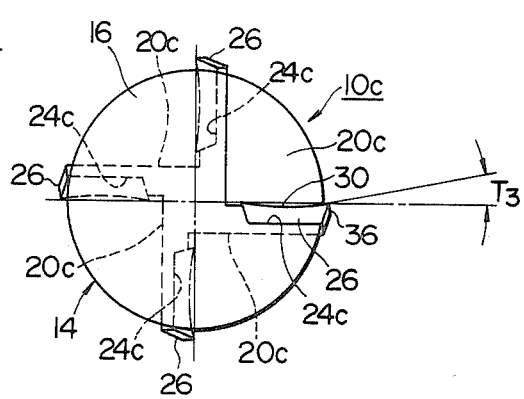
FIG. 39 is an end view of the cutter of FIG. 38.

FIGS. 35 and 36 show a rotary cutter 10b in accordance with a third embodiment of the present invention which differs from the cutter 10 of the first embodiment in that a cutter insert 26b employed therein comprises a generally square plate having a curved front face 30b. A pair of opposed marginal ridges of the front face 30b serve as respective main cutting edges 36b. The front face 30b is concavely arcuate as viewed along each of the main cutting edges 36b, and is convexly arcuate as viewed from each of the main cutting edges 36b. The insert 26b is releasably mounted in the recess 24 in such a manner that the main cutting edges 36b are disposed in radially spaced relation to each other with respect to the body 12. The radially outer main cutting edge 36b is indexed in its working position so as to slightly protrude from the circumferential surface 18, and a mounting inclination angle E of the insert 26b is selected to be positive, the indexed outer main cutting edge 36b sloping radially outwardly toward the rearward end of the cutter body 12.

Figure 40:
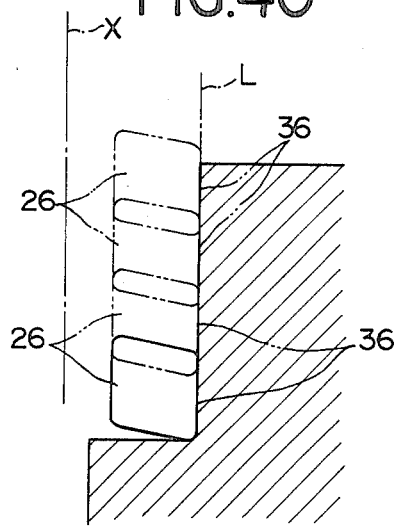
FIG. 40 is a schematic front-elevational view of cutter inserts employed in the cutter of FIG. 38, showing their disposition.
Figure 41:
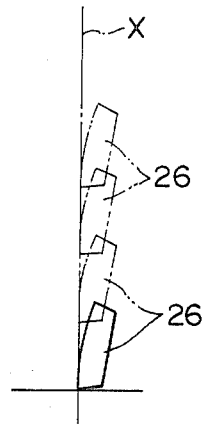
FIG. 41 is a schematic side-elevational view of the inserts of FIG. 40.
Figure 42:
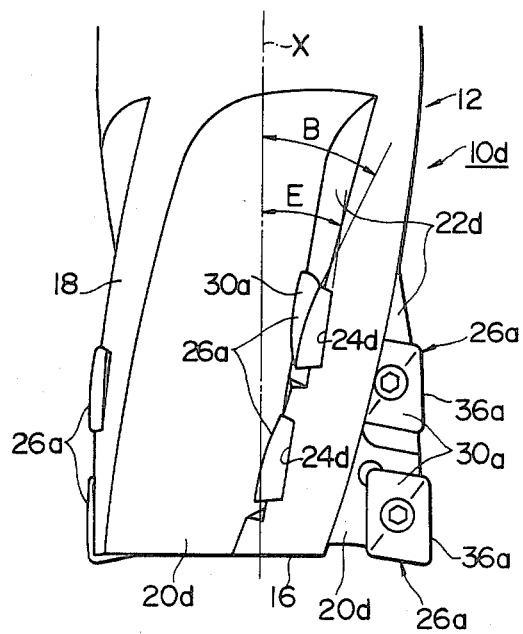
FIG. 42 is a front-elevational view of an insert rotary cutter in accordance with a fifth embodiment of the present invention.

FIGS. 38 to 41 show a rotary cutter 10c in accordance with a fourth embodiment of the present invention which differs from the cutter 10 of the first embodiment in that a forward end 14 of a cutter body 12 thereof includes a plurality of, say four, pockets 20c formed in a circumferential surface 18 in circumferentially and axially equally spaced relation to one another, the pockets 20c opening to the circumferential surface 18 with the one of the pockets 20c closest to a forward end face 16 opening also to the forward end face 16. Each pocket 20c has a circumferentially facing surface 22c sloping in the circumferential direction opposite to that of rotation of the body 12 away from the forward end face 16. Each surface 22c includes a recess 24c having a bottom face disposed parallel to the surface 22c and opening to the circumferential surface 18, the recess 24c in the pocket 20c closest to the forward end face 16 opening also to the forward end face 16. Releasably mounted in each of the recesses 24c is the same indexable cutter insert 26 as that in the cutter 10 in accordance with the first embodiment of the present invention. Each insert 26 is disposed in such a manner that the radially outer main cutting edge 36 is indexed in its working position so as to slightly protrude radially outwardly from the circumferential surface 18 of the body 12 and to extend generally along the bottom face of a respective one of the recesses 24, and that a mounting inclination angle E of each insert 26 with respect to the axis X of the body 12 is selected to be positive. The indexed outer main cutting edges 36 of the four inserts 26 are disposed, as shown in FIGS. 40 and 41, in series axially of the body 12 as viewed in the circumferential direction, so as to be brought into alignment with and pass through a common line L generally parallel to the axis X of the body 12 when the body 12 is rotated.

Figure 44:
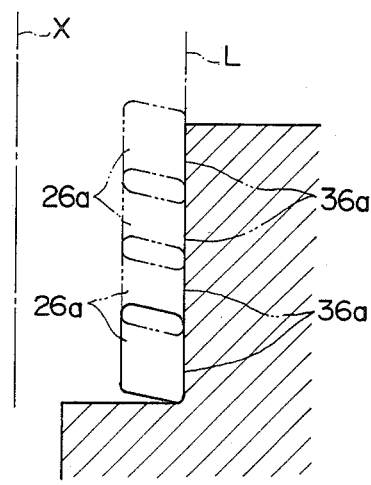
FIG. 44 is a schematic front-elevational view of cutter inserts employed in the cutter of FIG. 42, showing their disposition.
Figure 43:
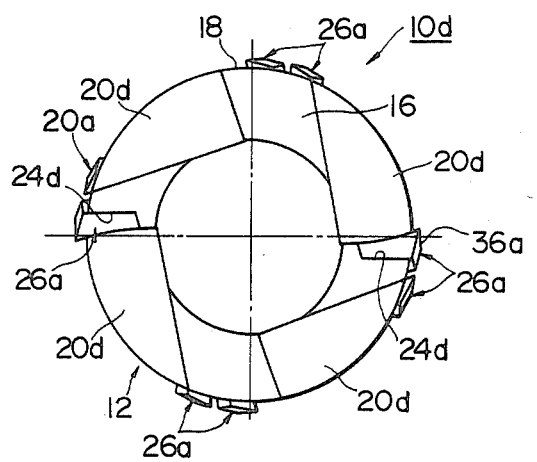
FIG. 43 is an end view of the cutter of FIG. 42.
Figure 45:
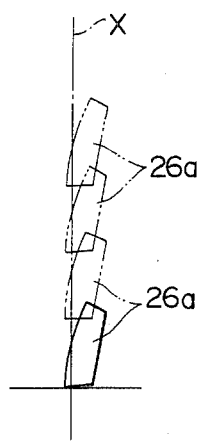
FIG. 45 is a schematic side-elevational view of the inserts of FIG. 44.

FIGS. 42 to 45 show a rotary cutter 10d in accordance with a fifth embodiment of the present invention. A cutter body 12 of the cutter 10d includes a plurality of, say four, pockets 20d formed in a circumferential surface 18 in circumferentially spaced relation to one another, each pocket 20d opening to both the circumferential surface 18 and a forward end face 16. Each pocket 20d has a generally circumferentially facing surface 22d sloping in a circumferential direction opposite to that of rotation of the body 12. Each surface 22d includes a plurality of, say two, recesses 24d formed therein in generally axially and circumferentially spaced relation to each other. Each recess 24d has a circumferentially facing bottom face sloping in a circumferential direction opposite to the direction of rotation of the body 12 away from the forward end face 16, and is opening to the circumferential surface 18, the foremost recess 24d in at least one of the surfaces 22d opening also to the forward end face 16. Releasably mounted in each recess 24d is the same cutter insert 26a as that in the cutter 10a in accordance with the second embodiment. The inserts 26a are disposed in such a manner that mounting inclination angles E of the inserts 26a with respect to the axis X of the body 12 are selected to be positive and equal to each other, and the radially outer main cutting edge 36a of each insert 26a is indexed in its working position so as to slightly protrude radially outwardly from the circumferential surface 18. The indexed outer main cutting edges 36 of the inserts 26a are disposed, as shown in FIGS. 44 and 45, in series axially of the body 12 as viewed in the circumferential direction, so as to be brought into alignment with and pass through a common line L generally parallel to the axis X of the body 12 when the body 12 is rotated during cutting operation.

Figure 46:
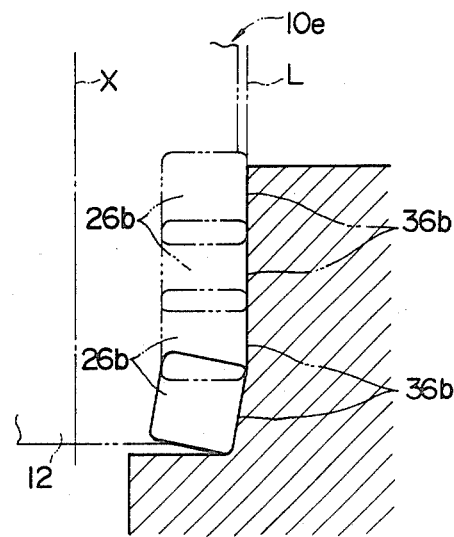
FIG. 46 is a schematic front-elevational view of an insert rotary cutter in accordance with a sixth embodiment of the present invention.
Figure 47:
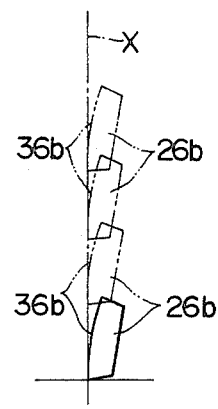
FIG. 47 is a schematic side-elevational view of the inserts of the cutter of FIG. 46.

FIGS. 46 and 47 show a rotary cutter 10e in accordance with a sixth embodiment of the present invention which differs from the cutter 10d of the fifth embodiment in that the same square inserts 26b as those in the cutter 10b of the third embodiment are releasably mounted in the respective recesses 24d. The radially outer main cutting edge 36b of each insert 26b is indexed in its working position so as to slightly protrude radially outwardly from the circumferential surface 18. The indexed outer main cutting edges 36b of the inserts 26b are disposed in series axially of the body 12 as viewed in the circumferential direction in such a manner that the indexed main cutting edge 36b of the foremost insert 26b is sloping radially outwardly in the rearward direction of the body 12, and that the indexed main cutting edges 36c of the remaining inserts 36b are brought into alignment with and pass through a common line L generally parallel to the axis X of the body 12 when the body 12 is rotated during cutting operation.

Figure 48:
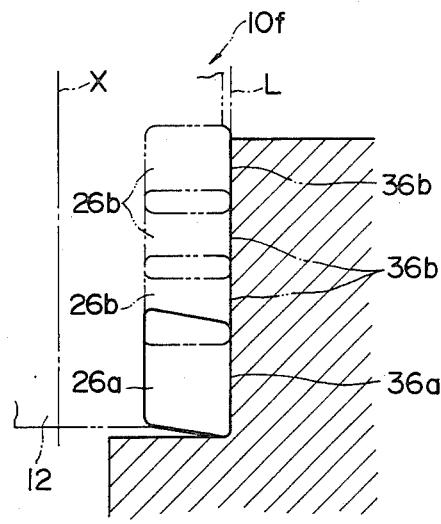
FIG. 48 is a schematic front-elevational view of an insert rotary cutter in accordance with a seventh embodiment of the present invention.
Figure 49:
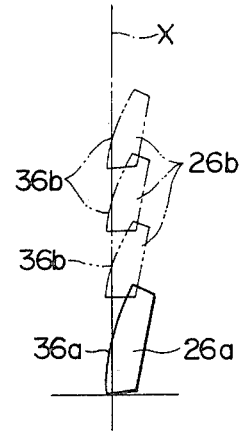
FIG. 49 is a schematic side-elevational view of the inserts of the cutter of FIG. 48.
Figure 50:
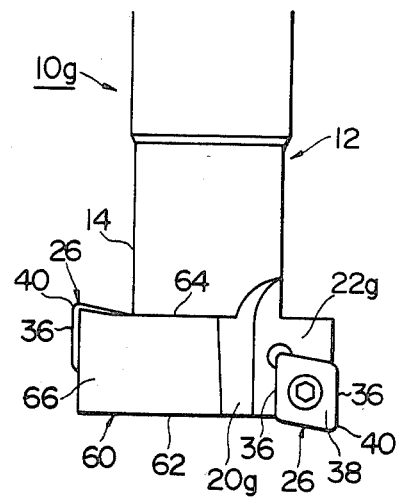
FIG. 50 is a front-elevational view of an insert rotary cutter in accordance with an eighth embodiment of the present invention.
Figure 51:
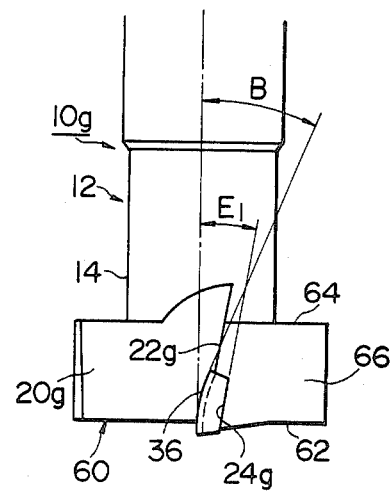
FIG. 51 is a side-elevational view of the cutter of FIG. 50.
Figure 52:
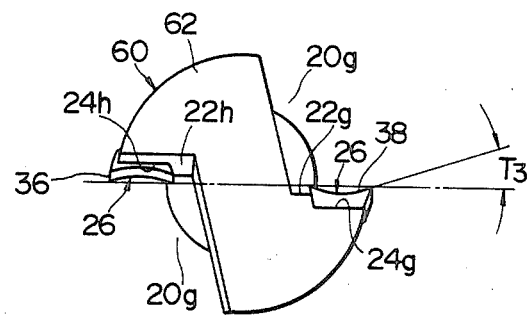
FIG. 52 is an end view of the cutter of FIG. 50.

FIGS. 48 and 49 show a rotary cutter 10f in accordance with a seventh embodiment of the present invention which differs from the cutter 10d of the fifth embodiment in that there are provided the same square inserts 26b as those in the cutter 10b of the third embodiment in addition to the parallelogrammic insert 26a. The indexed outer main cutting edges 36a and 36b of the inserts 26a and 26b are disposed in series axially of the body 12 as viewed in the circumferential direction, so as to be brought into alignment and pass a common line L generally parallel to the axis X of the body 12 when the body 12 is rotated during cutting operation.

Figure 54:
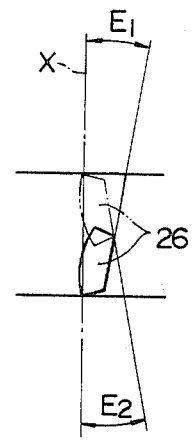
FIG. 54 is a schematic side-elevational view of the inserts of FIG. 53.
Figure 53:
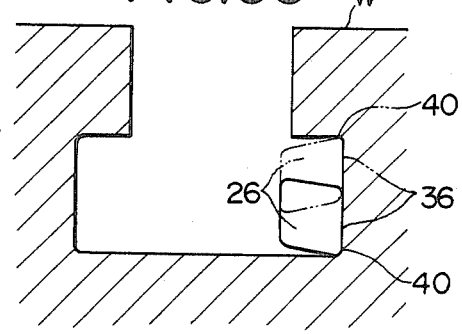
FIG. 53 is a schematic front-elevational view of cutter inserts employed in the cutter of FIG. 50, showing their disposition.
Figure 55:
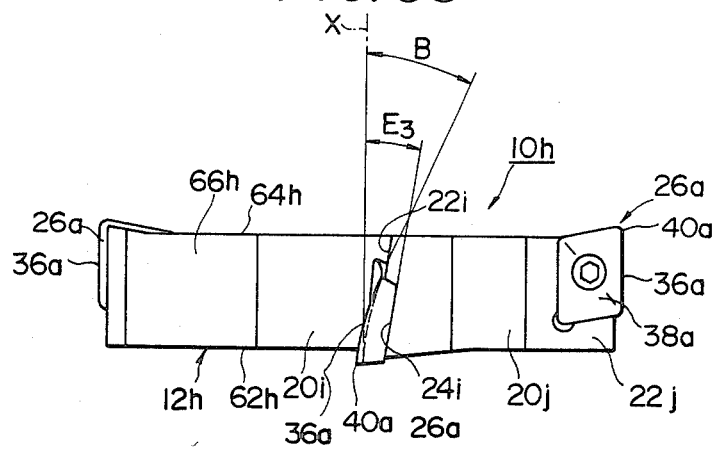
FIG. 55 is a front-elevational view of an insert rotary cutter in accordance with a ninth embodiment of the present invention.
Figure 56:
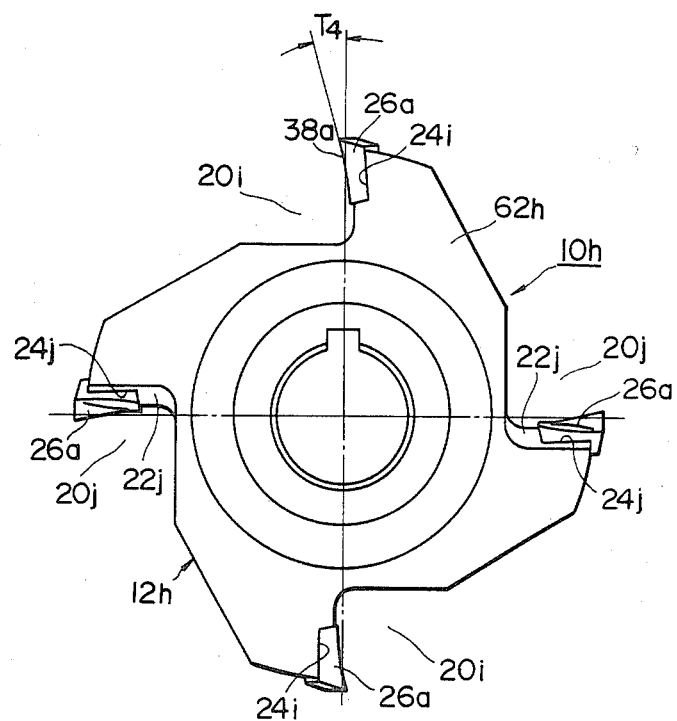
FIG. 56 is an end view of the cutter of FIG. 55.

FIGS. 50 to 54 show a rotary cutter 10g in accordance with an eighth embodiment of the present invention which comprises a cutter body 12 having a disk-shaped base portion 60 of a circular cross-section integrally formed at a forward end 14 thereof in coaxial relation thereto. The base portion 60 has a forward axial face 62, a rearward axial face 64 and a circumferential surface 66 lying between the forward and rearward axial faces 62 and 64. The base portion 60 also includes a pair of pockets 20g formed in the circumferential surface 66 in diametrically opposite relation, each pocket 20g opening to the forward and rearward axial faces 62 and 64 and the circumferential surface 66. The pair of pockets 20g have respective circumferentially facing surfaces 22g and 22h, the surface 22g in the one pocket 20g sloping in the circumferential direction opposite to that of rotation of the body 12 away from the forward axial face 62 while the surface 22h in the other pocket 20g is sloping in the same circumferential direction away from the rearward axial face 64. Formed in the surfaces 22g and 22h are recesses 24g and 24h having bottom faces parallel to the surfaces 22g and 22h, respectively, the recess 24g opening to both the forward axial face 62 and the circumferential surface 66 while the recess 24h is opening to both the rearward axial face 64 and the circumferential surface 66. The same cutter inserts 26 as that in the cutter 10 of the first embodiment are releasably mounted in the recesses 24g and 24h, respectively, in such a manner that the main cutting edges 36 of each insert 26 are disposed in radially spaced relation to each other with respect to the body 12. With respect to the insert 26 disposed in the recess 24g, the radially outer main cutting edge 36 and the corner cutting edge 40 adjacent the foremost end thereof are indexed in their working positions, and a mounting inclination angle $E_1$ of the insert 26 with respect to the axis X of the body 12 is selected to be positive, the outer main cutting edge 36 slightly protruding radially outwardly from the circumferential surface 66 and extending along the bottom face of the recess 24g. With respect to the insert 26 disposed in the recess 24h, the radially outer main cutting edge 36 and the corner cutting edge 40 adjacent the rearmost end thereof are indexed in their working positions, and a mounting inclination angle $E_2$ of the insert 26 with respect to the axis X of the body 12 is selected to be positive, the outer main cutting edge 36 slightly protruding radially outwardly from the circumferential surface 66 and extending along the bottom face of the recess 24h. The indexed outer main cutting edges 36 of the inserts 26 are disposed, as shown in FIGS. 53 and 54, in series axially of the body 12 as viewed in the circumferential direction, so as to cooperate to form a T-shaped groove or the like in the workpiece W.

Figure 57:
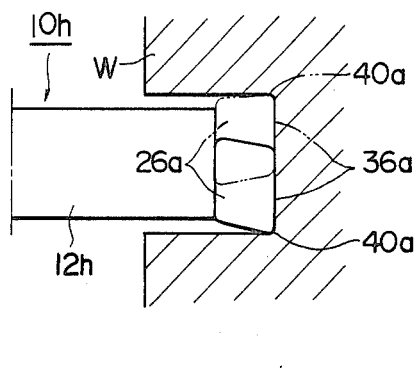
FIG. 57 is a schematic front-elevational view of the cutter of FIG. 55, showing the disposition of cutter inserts employed therein.
Figure 58:
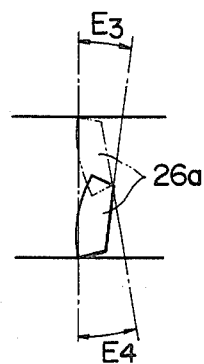
FIG. 58 is a schematic side-elevational view of the inserts of the cutter of FIG. 57.

FIGS. 55 to 58 show a rotary cutter 10h in accordance with an ninth embodiment of the present invention which comprises a disk-shaped cutter body 12h having forward and rearward axial faces 62h and 64h and a circumferential surface 66h lying between the forward and rearward axial faces 62h and 64h. The body 12h includes plural pairs of pockets, say first and second pairs of pockets 20i and 20j, formed in a circumferential surface 66h in circumferentially equally spaced relation to each other. The first pair of pockets 20i have respective circumferentially facing surfaces 22i sloping in the circumferential direction opposite to that of rotation of the body 12h away from the forward axial face 62h while the second pair of pockets 20j have respective circumferentially facing surfaces 22j sloping in the same circumferential direction away from the rearward axial face 64h. Formed in the surfaces 22i and 22j are recesses 24i and 24j having bottom faces parallel to the surfaces 22i and 22j, respectively, the recesses 24i opening to both the forward axial face 62h and the circumferential surface 66h while the recesses 24j are opening to both the rearward axial face 64h and the circumferential surface 66h. The same cutter inserts 26a as those in the cutter 10a of the second embodiment are releasably mounted in the recesses 24i and 24j, respectively, in such a manner that the main cutting edges 36a of each insert 26a are disposed in radially spaced relation to each other with respect to the body 12h. With respect to the insert 26a disposed in each of the recesses 24i, the radially outer main cutting edge 36a and the corner cutting edge 40a adjacent the foremost end thereof are indexed in their working positions, and a mounting inclination angle $E_3$ of the insert 26a with respect to the axis X of the body 12h is selected to be positive, the outer main cutting edge 36a slightly protruding radially outwardly from the circumferential surface 66h and extending along the bottom face of a respective one of the recesses 24i. With respect to the insert 26a disposed in each of the recesses 24j, the radially outer main cutting edge 36a and the corner cutting edge 40a adjacent the rearmost end thereof are indexed in their working positions, and a mounting inclination angle $E_4$ of the insert 26a with respect to the axis X of the body 12h is selected to be positive, the outer main cutting edge 36a slightly protruding radially outwardly from the circumferential surface 66h and extending along the bottom face of a respective one of the recesses 24j. The indexed outer main cutting edges 36a of the inserts 26a are disposed, as shown in FIGS. 57 and 58, in series axially of the body 12h as viewed in the circumferential direction, so as to cooperate to form a T-shaped groove or the like in the workpiece W.

Figure 59:
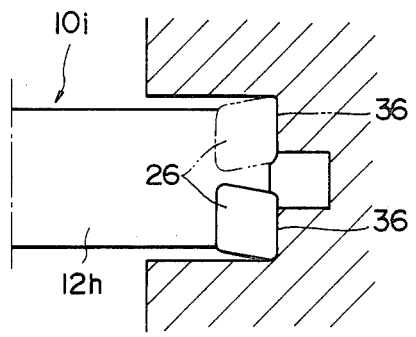
FIG. 59 is a view similar to FIG. 57, but showing a rotary cutter in accordance with a tenth embodiment of the present invention.

FIG. 59 shows a rotary cutter 10i in accordance with a tenth embodiment of the present invention which differs from the cutter 10h of the ninth embodiment in that the same rhombic inserts 26 as that in the cutter 10 of the first embodiment are employed, and that the indexed outer main cutting edges 36 of the inserts 26 are disposed in series axially of the body 12h in axially spaced relation to each other with respect to the body 12h as viewed in the circumferential direction.

Figure 60:
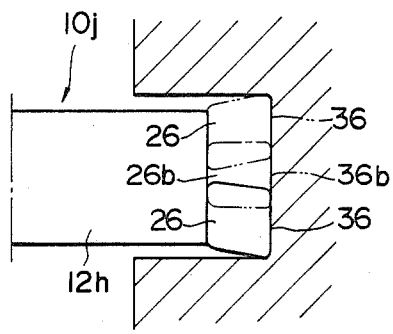
FIG. 60 is a view similar to FIG. 57, but showing a rotary cutter in accordance with an eleventh embodiment of the present invention.

FIG. 60 shows a rotary cutter 10j in accordance with an eleventh embodiment of the present invention which differs from the cutter 10i of the tenth embodiment in that at least one square cutter insert 26b is disposed between the inserts 26 in the recesses 24i and the inserts 26 in the recesses 24j so that the indexed outer main cutting edges 36 and 36b of the inserts 26 and 26b are brought into alignment with and pass through a common line parallel to the axis of the body 12h when the body 12h is rotated during cutting operation.

Figure 61:
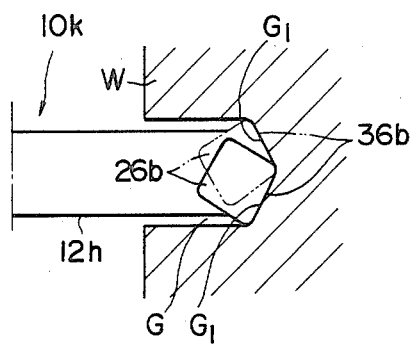
FIG. 61 is a view similar to FIG. 57, but showing an rotary cutter in accordance with a twelfth embodiment of the present invention.

FIG. 61 shows a rotary cutter 10k in accordance with a twelfth embodiment of the present invention which differs from the ninth embodiment 10h in that the same square inserts 26b as that in the cutter 10b of the third embodiment are employed, and that the indexed outer main cutting edges 36b of the inserts 26b in the recesses 24i are sloping radially outwardly in the rearward direction of the body 12h while the indexed outer main cutting edges 36b of the inserts 26b in the recesses 24j are sloping radially outwardly in the forward direction thereof, the inserts 26b being disposed in generally overlapping relation to each other as viewed in the circumferential direction so as to cooperate to form a groove G having oblique faces $G_1$ or the like in the workpiece W.

In each of the inserts of the cutters in accordance with the third to twelfth embodiments described above, since the front face is convexly arcuate as viewed from each of the main cutting edges and is concavely arcuate as viewed along each of the main cutting edges, a tangent angle of the rake surface along the indexed outer main cutting edge is positive. Thus, in the cutters employing the inserts, true rake angles corresponding to the tangent angles become positive along the total length of the indexed outer main cutting edges. Accordingly, even in deep cutting operation, the cutters are subjected to less cutting resistance, thereby achieving excellent machinability. In addition, as is the case with the conventional cutters employing the inserts each having convex front face, at the rearward portion of the indexed outer main cutting edge of each insert extending rearwardly of the body from the central point thereof, the tangent angle is positive and larger than the mounting inclination angle of each insert, so that the cutters has the same advantageous features as the conventional cutters have.

In the cutters mentioned above, although the front face of each insert is defined by a part of a hyperboloid of one sheet, the front face may be defined by a part of a quadratic surface such as a hyperbolic paraboloid.

Obviously many modifications and variations of the present invention are possible in the light of the above teachings. It is therefore to be understood that within the scope of the appended claims, the invention may be practiced otherwise than as specifically described.

What is claimed is:

1. An insert rotary cutter for processing a metal workpiece comprising:
   a cutter body having an axis of rotation therethrough; and
   at least one cutter insert releasably mounted on an outer periphery of said body, said insert being of a generally polygonal shape having a front face, said front face having at least one marginal ridge with said marginal ridge serving as a respective main cutting edge, said front face having a marginal portion disposed adjacent and extending along said main cutting edge, said marginal portion serving as a rake surface for said main cutting edge, said rake surface being convexly curved as viewed in a side elevation and being concavely curved as viewed along said main cutting edge.

2. An insert rotary cutter according to claim 1, in which said insert has an axis passing through the center of said front face, said front face having another marginal ridge extending substantially parallel to said at least one marginal ridge and each marginal ridge constituting a respective main cutting edge, said front face having a pair of opposed edges each extending between said marginal ridges, said front face being concavely arcuately shaped between said main cutting edges and being convexly arcuately shaped between said opposed edges, said main cutting edges being convexly arcuately shaped when each is viewed in side elevation and said opposed edges being concavely arcuately shaped as viewed in side elevation, said front face being symmetrically shaped relative to said axis of said insert.

3. An insert rotary cutter for processing a metal workpiece comprising:
   a cutter body having an axis of rotation therethrough; and at least one cutter insert releasably mounted on an outer periphery of said body, said insert being of a generally quadrilateral shape having four corners and a non-planar front face having an axis passing through the center of said front face, said front face having at least four marginal ridge with at least two of said ridges extending in opposed, parallel relation to one another and serving as respective main cutting edges, said front face having marginal portions disposed adjacent and extending along said main cutting edges, said marginal portions serving as respective rake surfaces of said main cutting edges, said cutting edges being disposed in spaced generally parallel relation, said main cutting edges being convexly arcuately curved and said other two of said four marginal ridges being concavely arcuately curved, each of said main cutting edges having a first end and a second end with said respective ends being spaced axially of said body, said insert having one end and an opposite end with said first end of one main cutting edges being at said one end and said first end of the other of said main cutting edges being at said opposite end of said insert, said front face, with respect to a first plane passing through said second ends of said main cutting edges and including said axis of said front face, being symmetrically concavely curved, said front face, with respect to a plane extending perpendicular to said first plane and including said axis of said front face, being symmetrically convexly curved.

4. An insert rotary cutter according to claim 1, claim 2 or claim 3, in which said body includes a forward end having a forward end face and a circumferential surface, said forward end having at least one pocket formed therein and opening to both said circumferential surface and said forward end face, said pocket including a recess having a circumferentially facing bottom face sloping in a circumferential direction opposite to a direction of rotation of said body away from said forward end face, said recess opening to both said circumferential surface and said forward end face, said insert being releasably mounted in said recess in such a manner that a mounting inclination angle of said insert with respect to said axis of said body is selected to be positive, and that one of said main cutting edges is indexed in its working position so as to slightly protrude radially outwardly from said circumferential surface.

5. An insert rotary cutter according to claim 4, in which said forward end includes a plurality of said pockets formed therein in circumferentially spaced relation to one another.

6. An insert rotary cutter according to claim 4, in which the disposition of said insert is such that said indexed main cutting edge is sloping radially outwardly rearwardly of said body.

7. An insert rotary cutter according to claim 1, in which said body includes a forward end having a forward end face and a circumferential surface, said forward end having a plurality of pockets formed in said circumferential surface in circumferentially and axially spaced relation to one another, said pockets opening to said circumferential surface with the one of said pockets closest to said forward end face opening also to said forward end face, each pocket including a recess having a circumferentially facing bottom face sloping in a circumferential direction opposite to a direction of rotation of said body away from said forward end face, said recesses opening to said circumferential surface with the one of said recesses in said pocket closest to said forward end face opening also to said forward end face, a plurality of said inserts being releasably mounted in said recesses, respectively, in such a manner that a mounting inclination angle of each insert with respect to said axis of said body is selected to be positive, and that one of said main cutting edges of each insert is indexed in its working position so as to slightly protrude radially outwardly from said circumferential surface, the disposition of said indexed main cutting edges are such that they are in series axially of said body as viewed circumferentially of said body so as to be brought into alignment with and pass through a common line when said body is rotated.

8. An insert rotary cutter according to claim 1, in which said body includes a forward end having a forward end face and a circumferential surface, said forward end having a plurality of pockets formed in said circumferential surface in circumferentially spaced relation to one another, said pockets opening to both said circumferential surface and said forward end face, each pocket including a plurality of recesses formed therein in generally axially spaced relation to each other, each recess having a circumferentially facing bottom face sloping in a circumferential direction opposite to a direction of rotation of said body away from said forward end face, each recess opening to said circumferential surface with the one of said recesses closest to said forward end face in at least one said pocket opening also to said forward end face, a plurality of said inserts being releasably mounted in said recesses, respectively, in such a manner that a mounting inclination angle of each insert with respect to said axis of said body is selected to be positive, and that one of said main cutting edges is indexed in its working position to slightly protrude radially outwardly from said circumferential surface, the disposition of said indexed main cutting edges is such that they are in series axially of said body as viewed circumferentially of said body so as to be brought into alignment with and pass through a common line to cooperate to process said workpiece.

9. An insert rotary cutter according to claim 1, in which said body includes a disk-shaped base portion of a generally circular cross-section, said base portion including a forward axial face, a rearward axial face and a circumferential surface lying between said forward and rearward axial faces, said base portion having a pair of pockets formed therein in diametrically opposite relation, said pockets opening to said circumferential surface and said forward and rearward axial faces, one of said pockets including a recess formed in a forward portion thereof and opening to both said circumferential surface and said forward axial face while the other pocket includes a recess formed in a rearward portion thereof and opening to both said circumferential surface and said rearward axial face, said recess in said one pocket having a circumferentially facing bottom face sloping in a circumferential direction opposite to a direction of rotation of said body away from said forward axial face while said recess in said other pocket having a circumferentially facing bottom face sloping in said circumferential direction away from said rearward axial face, a pair of said inserts being releasably mounted in said recesses, respectively, in such a manner that a mounting inclination angle of each insert with respect to said axis of said body is selected to be positive, and that one of said main cutting edges is indexed in its working position so as to slightly protrude radially outwardly from said circumferential surface.

10. An insert rotary cutter according to claim 1, in which said body includes a disk-shaped base portion of a generally circular cross-section, said base portion including a forward axial face, a rearward axial face and a circumferential surface lying between said forward and rearward axial faces, said base portion having a plurality of pockets formed therein in circumferentially spaced relation to one another, said pockets opening to said circumferential surface and said forward and rearward axial faces, said pockets including a plurality of recesses disposed in forward and rearward end portions thereof in staggered relation to one another, each of said recesses in said forward end portions of said pockets opening to both said forward axial face and said circumferential surface and having a circumferentially facing bottom face sloping in a circumferential direction opposite to a direction of rotation of said body away from said forward axial face, each of said recesses in said rearward portions of said pockets opening to both said rearward axial face and said circumferential surface and having a circumferentially facing bottom face sloping in said circumferential direction away from said rearward axial face, a plurality of said inserts being releasably mounted in said recesses, respectively, in such a manner that a mounting inclination angle of each insert with respect to said axis of said body is selected to be positive, and that one of said main cutting edges is indexed in its working position so as to slightly protrude radially outwardly from said circumferential surface.

11. An insert rotary cutter according to claim 7, claim 8, claim 9 or claim 10, in which the disposition of said inserts is such that said indexed main cutting edges are disposed in a series axially of said body as viewed circumferentially of said body so as to be brought into alignment with and pass through a common line when said body is rotated.

12. An insert rotary cutter according to claim 11, in which said common line is parallel to said axis of said body.

13. An insert rotary cutter according to claim 11, in which said indexed main cutting edges are disposed in axially spaced relation to each other as viewed circumferentially of said body.

14. An insert rotary cutter according to claim 10, in which at least one said insert is releasably mounted on said base portion intermedite said forward and rearward axial faces.

15. A cutter insert for an insert rotary cutter, said insert being of a gnerally polygonal shape for processing a metal workpiece comprising:
    a cutter body having an axis of rotation therethrough; and
    at least one cutter insert releasably mounted on an outer periphery of said body, said insert being of a generally polygonal shape having a front face, said front face having at least one marginal ridge with said marginal ridge serving as a respective main cutting edge, said front face having a marginal portion disposed adjacent and extending along said main cutting edge, said marginal portion serving as a rake surface for said main cutting edge, said rake surface being convexly curved as viewed in a side elevation and being concavely curved as viewed along said main cutting edge.

16. A cutter insert as claimed in claim 15 in which said insert has an axis passing through the center of said front face, said front face having another marginal ridge extending substantially parallel to said at least one marginal ridge and each marginal ridge constituting a respective main cutting edge, said front face having a pair of opposed edges each extending between said marginal ridges, said front face being concavely arcuately shaped between said main cutting and edges and being convexly arcuately shaped between said opposed edges, said main cutting edges being convexly arcuately shaped when each is viewed in side elevation and said opposed edges being concavely arcuately shaped as viewed in side elevation, said front face being symmetrically shaped relative to said axis of said insert.

17. A cutter insert for an insert rotary cutter having a generally quadrilateral shape having four corners and a nonplanar front face having an axis passing through the center of said front face, said front face having at least four marginal ridges with at least two of said ridges extending in opposed, parallel relation to one another and serving as respective main cutting edges, said front face having marginal portions disposed adjacent and extending along said main cutting edges, said marginal portions serving as respective rake surfaces of said main cutting edges, said cutting edges being disposed in spaced generally parallel relation, said main cutting edges being convexly arcuately curved and said other two of said four marginal ridges being concavely arcuately curved, each of said main cutting edges having a first end and a second end with said respective ends being spaced axially of said body, said insert having one end and an opposite end with said first end of one main cutting edges being at said one end and said first end of the other of said main cutting edges being at said opposite end of said insert, said front face, with respect to a first plane passing through said second ends of said main cutting edges and including said axis of said front face being symmetrically concavely curved, said front face, with respect to a plane extending perpendicular to said first plane and including said axis of said front face, being symmetrically convexly curved.

18. A cutter insert according to claim 15, claim 16 or claim 17 being of a rhombic shape.

19. A cutter insert according to claim 15, claim 16 or claim 17 being of a square shape.

20. A cutter insert according to claim 15, claim 16 or claim 17 being of a parallelogrammic shape.

* * * * *